United States Patent
Nakanishi et al.

(10) Patent No.: US 9,975,115 B2
(45) Date of Patent: May 22, 2018

(54) PHOTOCATALYST FOR WATER SPLITTING COMPRISING GALLIUM SELENIDE AND PHOTOELECTRODE FOR WATER SPLITTING COMPRISING THE SAME

(71) Applicants: TOYOTA JIDOSHA KABUSHIKI KAISHA, Toyota-shi, Aichi-ken (JP); THE UNIVERSITY OF TOKYO, Bunkyo-ku, Tokyo (JP)

(72) Inventors: Haruyuki Nakanishi, Susono (JP); Tsutomu Minegishi, Tokyo (JP); Kazunari Domen, Tokyo (JP); Jun Kubota, Tokyo (JP); Chika Miwada, Tokyo (JP)

(73) Assignees: TOYOTA JIDOSHA KABUSHIKI KAISHA, Toyota-shi (JP); THE UNIVERSITY OF TOKYO, Tokyo (JP)

( * ) Notice: Subject to any disclaimer, the term of this patent is extended or adjusted under 35 U.S.C. 154(b) by 0 days. days.

(21) Appl. No.: 14/640,628

(22) Filed: Mar. 6, 2015

(65) Prior Publication Data

US 2015/0196901 A1 Jul. 16, 2015

Related U.S. Application Data

(63) Continuation of application No. 14/004,252, filed as application No. PCT/JP2012/054685 on Feb. 20, 2012.

(30) Foreign Application Priority Data

Mar. 10, 2011 (JP) ................................. 2011-052967

(51) Int. Cl.
*B01J 19/12* (2006.01)
*B01J 35/00* (2006.01)
(Continued)

(52) U.S. Cl.
CPC ............. *B01J 35/02* (2013.01); *B01J 19/123* (2013.01); *B01J 23/08* (2013.01); *B01J 23/66* (2013.01);
(Continued)

(58) Field of Classification Search
CPC . B01J 19/123; B01J 23/08; B01J 23/66; B01J 23/686; B01J 37/0238;
(Continued)

(56) References Cited

U.S. PATENT DOCUMENTS 4,626,322 A 12/1986 Switzer
8,071,400 B2 12/2011 Kawano
(Continued)

FOREIGN PATENT DOCUMENTS

JP 2010-046604 A 3/2010
JP 2010-519057 A 6/2010
WO 2008/102351 A2 8/2008

OTHER PUBLICATIONS

Chen et al, "Synthesis and characterization of silver gallium selenide thin film for photoelectrochemical application," Abstracts of Papers, 240th ACS National Meeting, Boston, MA, United States, Aug. 22-26, 2010 pp. FUEL-169.*
(Continued)

*Primary Examiner* — Ibrahime A Abraham
*Assistant Examiner* — Colleen M Raphael
(74) *Attorney, Agent, or Firm* — Hunton Andrews Kurth LLP

(57) ABSTRACT

Provided are a photocatalyst having higher activity for hydrogen production through water splitting and a photoelectrode comprising the photocatalyst. The photocatalyst for water splitting of the present invention comprises a Ga selenide, an Ag—Ga selenide, or both thereof.

6 Claims, 6 Drawing Sheets

(51) Int. Cl.
*B01J 23/66* (2006.01)
*B01J 27/057* (2006.01)
*B01J 35/02* (2006.01)
*B01J 23/08* (2006.01)
*B01J 23/68* (2006.01)
*B01J 37/02* (2006.01)
*C01B 3/04* (2006.01)
*C25B 1/00* (2006.01)
*C25B 11/04* (2006.01)
*C25B 1/04* (2006.01)

(52) U.S. Cl.
CPC ......... *B01J 23/686* (2013.01); *B01J 27/0573* (2013.01); *B01J 35/004* (2013.01); *B01J 37/0238* (2013.01); *B01J 37/0244* (2013.01); *C01B 3/042* (2013.01); *C25B 1/003* (2013.01); *C25B 1/04* (2013.01); *C25B 11/0478* (2013.01); *B01J 2219/1203* (2013.01); *C01B 2203/0277* (2013.01); *C01B 2203/1005* (2013.01); *C01B 2203/1041* (2013.01); *Y02E 60/364* (2013.01); *Y02E 60/368* (2013.01)

(58) Field of Classification Search
CPC .. B01J 27/0573; B01J 37/0244; B01J 35/004; B01J 35/02; B01J 2219/1203; C25B 1/04; C25B 11/0478; C25B 1/003; C01B 3/042; C01B 2203/1005; C01B 2203/0277; C01B 2203/1041
USPC .......................... 204/157.5, 157.52; 205/340
See application file for complete search history.

(56) References Cited

U.S. PATENT DOCUMENTS

| | | | |
|---|---|---|---|
| 2010/0044209 A1 | 2/2010 | Banin et al. | |
| 2011/0294254 A1* | 12/2011 | Jackrel | H01L 31/0322 438/95 |
| 2012/0168910 A1* | 7/2012 | Jackrel | H01L 21/268 257/613 |
| 2012/0270363 A1* | 10/2012 | Jackrel | C23C 18/1204 438/95 |
| 2012/0313200 A1* | 12/2012 | Jackrel | H01L 31/0322 257/431 |

OTHER PUBLICATIONS

Chen et al, "Synthesis and characterization of silver gallium selenide for photoelectrochemical application," Prep. Pap.—Am. Chem. Soc., Div Fuel Chem. 2010, 55 (2), 267.*
Nigge, K.-M. et al., "CVT-Growth of AgGaSe2 Single Crystals: Electrical and Photoluminescence Properties," Solar Energy Materials and Solar Cells, Elsevier Science Publishers, Amsterdam, NL, vol. 43, No. 4, Oct. 15, 1996, pp. 335-343.
Campos, C.E.M. et al., "GaSe Formation by Mechanical Alloying Ga50Se50 Mixture," Solid State Communications, Pergamon, GB, vol. 126, No. 11, Jun. 1, 2003, pp. 611-615.
Karaagac, H. et al., "Effects of annealing on structural and morphological properties of e-beam evaporated AgGaSe2 thin films," Applied Surface Science, 255, 2009, p. 5999-6006 (cited in U.S. Appl. No. 14/004,252).
Bhuiyan, M. R. a.,et al., "Valence-band characterization of AgGaSe2 thin films," Journal of Physics D: Applied Physics, 41, 2008, 5 pages (cited in U.S. Appl. No. 14/004,252).
Simchi, H. et al., "An Investigation of the Surface Properties of (Ag,Cu)(In,Ga)Se2 Thin Films," IEEE Journal of Photovoltaics, vol. 2, No. 4, 2012, p. 519-523 (cited in U.S. Appl. No. 14/004,252).
Karaagac, H. et al., "Deposition and characterization of layer-by-layer sputtered AgGaSe2 thin films," Applied Surface Science, 257, 2011, pp. 5731-5738 (cited in U.S. Appl. No. 14/004,252).
Ishizaki, H. et al., Abstract of "Structural Properties of Ag-Based Chalcopyrite Compound Thin Films for Solar Cells," Mater. Res. Soc. Symp. Proc. vol. 865, 2005, 6 pages (cited in U.S. Appl. No. 14/004,252).

* cited by examiner

PHOTOCATALYST FOR WATER SPLITTING COMPRISING GALLIUM SELENIDE AND PHOTOELECTRODE FOR WATER SPLITTING COMPRISING THE SAME

CROSS REFERENCE TO RELATED APPLICATIONS

This is a continuation of U.S. patent application Ser. No. 14/004,252, filed on Sep. 10, 2013, which is a national phase application based on the PCT International Patent Application No. PCT/JP2012/054685 filed on Feb. 20, 2012 and claims priority to Japanese Patent Application No. 2011-052967 filed on Mar. 10, 2011, the entire contents of which are incorporated herein by reference.

TECHNICAL FIELD

The present invention relates to a photocatalyst for water splitting, more specifically, a photocatalyst for water splitting using energy such as sunlight to produce hydrogen, and a photoelectrode for water splitting comprising the same.

BACKGROUND ART

Hydrogen has been attracting attention as a clean fuel, because its combustion does not generate carbon dioxide. However, industrial production of hydrogen has depended on fossil fuels, and therefore carbon dioxide is emitted in the production process of hydrogen. Thus, even if hydrogen is used as a fuel, exhaustion of fossil fuels and global warming due to carbon dioxide cannot be solved. Therefore, a great deal of attention has been drawn to a photocatalyst capable of splitting water using a natural energy such as sunlight to produce hydrogen.

Japanese Unexamined Patent Publication (Kohyo) No. 2010-519057 describes use of at least one nanoparticle as a photocatalyst for a variety of chemical reactions such as redox reaction and water splitting wherein the at least one nanoparticle comprises at least one metal/metal alloy region and at least one semiconductor region having an absorption onset in the visible (400-700 nm) to near infrared (NIR) range (0.7-3 μm), wherein the at least one semiconductor region is of Group III-VI and is selected from the group consisting of InSe, InTe, InS, GaSe, InGaSe, InSeS, and alloys thereof.

Japanese Unexamined Patent Publication (Kokai) No. 2010-046604 describes a photocatalyst using a compound A comprising a metal ion having a $d^n$ ($0<n<10$)-type electron configuration, an oxide ion ($O^{2-}$), and an ion of at least one element B selected from the group consisting of H, Li, Na, K, Rb, Cs, Mg, Ca, Sr, rear earth elements, Ti, Zr, Hf, V, Nb, Ta, Mo, W, Cu, Ag, Au, Zn, Cd, Al, Ga, In, C, Si, Ge, Sn, N, P, Sb, S, Se, Te, F, Cl, Br, and I (provided that when the element B is a metal element, the ion of the element B has an electron configuration other than the $d^n$ ($0<n<10$)-type electron configuration). Japanese Unexamined Patent Publication (Kokai) No. 2010-046604 further describes that hydrogen can be produced by contacting such a photocatalyst with a hydrogen-containing compound while irradiating light.

SUMMARY OF THE INVENTION

As described above, Japanese Unexamined Patent Publication (Kohyo) No. 2010-519057 describes use of a nanoparticle including a combination of various metal/metal alloys and semiconductors as a photocatalyst for a variety of chemical reactions. However, Japanese Unexamined Patent Publication (Kohyo) No. 2010-519057 does not specifically disclose the water splitting activity of the nanoparticle when used in a water splitting reaction. Similarly, Japanese Unexamined Patent Publication (Kokai) No. 2010-046604 does not specifically disclose the water splitting activity of above compound A which is a photocatalyst when used in a water splitting reaction.

On the other hand, in order for a photocatalyst to effectively act in a water splitting reaction, it is generally preferred that the conduction band minimum (CBM) and the valence band maximum (VBM) of the photocatalyst are positioned so as to sandwich the reduction potential and the oxidation potential of water.

For example, a Cu-based chalcopyrite material such as $Cu(In,Ga)(Se,S)_2$ is generally a semiconductor material exhibiting p-type conductivity and is typically used in a polycrystalline state for a thin-film solar cell, etc., and this material is known to be advantageous, for example, in that the band gap corresponding to the energy difference from VBM to CBM can be controlled by changing the composition thereof. However, VBM of the $Cu(In,Ga)(Se,S)_2$ material is fairly low compared with the oxidation potential of water, and therefore sufficient water splitting activity cannot be achieved, even if such a material is used in a photocatalyst, a photoelectrode, etc., for water splitting.

Thus, an object of the present invention is to provide a photocatalyst having higher activity for hydrogen production through water splitting and a photoelectrode comprising the photocatalyst.

The present invention for attaining this object is as follows.

(1) A photocatalyst for water splitting, comprising a Ga selenide, an Ag—Ga selenide, or both thereof.

(2) The photocatalyst for water splitting as described in item (1), comprising both a Ga selenide and an Ag—Ga selenide.

(3) The photocatalyst for water splitting as described in item (1) or (2), wherein the Ga selenide is selected from the group consisting of GaSe, $Ga_2Se_3$ and a combination thereof.

(4) The photocatalyst for water splitting as described in item (3), wherein the Ga selenide is GaSe.

(5) The photocatalyst for water splitting as described in any one of items (1) to (4), wherein the Ag—Ga selenide is selected from the group consisting of $AgGaSe_2$, $AgGa_5Se_8$ and a combination thereof.

(6) The photocatalyst for water splitting as described in item (5), wherein the Ag—Ga selenide is $AgGaSe_2$.

(7) The photocatalyst for water splitting as described in any one of items (1) to (6), wherein the photocatalyst further comprises at least one of Rh and Pt supported thereon.

(8) A photoelectrode for water splitting, comprising a substrate, an electrically conductive layer formed on the substrate, and a photocatalyst layer formed on the electrically conductive layer and consisting of the photocatalyst for water splitting described in any one of items (1) to (7).

MODE FOR CARRYING OUT THE INVENTION

The photocatalyst for water splitting of the present invention comprises a Ga selenide, an Ag—Ga selenide, or both thereof.

As described above, it is known that a Cu-based chalcopyrite material such as Cu(In,Ga)(Se,S)$_2$ generally exhibits p-type conductivity, and its band gap, etc., can be controlled by changing the composition thereof.

Figure 1:
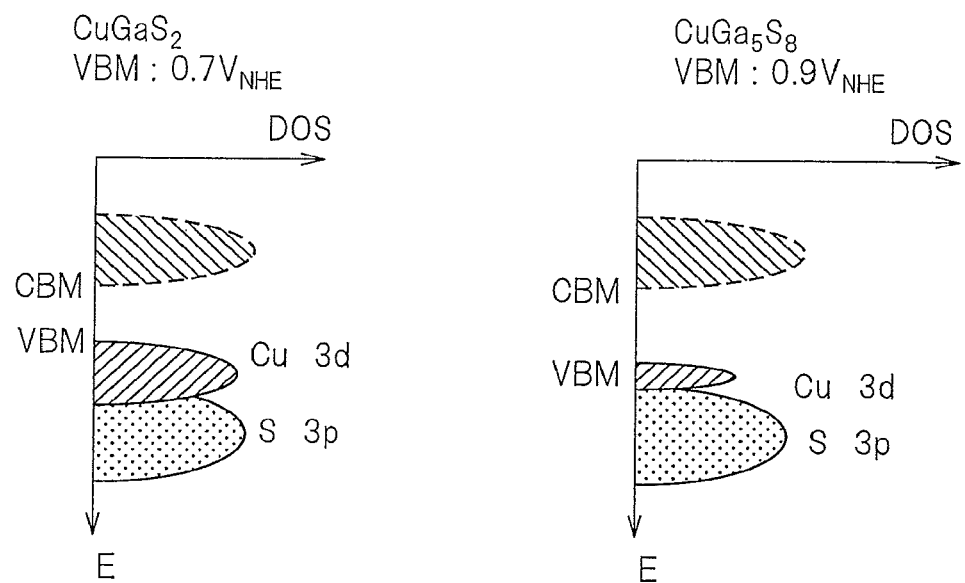
FIG. 1 is a schematic view showing the density of states (DOS) of $CuGaS_2$ and $CuGa_5S_8$ which correspond to a $Cu(In,Ga)(Se,S)_2$ material.

FIG. 1 is a schematic view showing the density of states (DOS) of CuGaS$_2$ and CuGa$_5$S$_8$ which correspond to a Cu(In,Ga) (Se,S)$_2$ material. Referring to FIG. 1, in both materials of CuGaS$_2$ and CuGa$_5$S$_8$, the valence band maximum (VBM) is composed of the 3d orbital of Cu, and the conduction band minimum (CBM) is positioned across the forbidden band corresponding to the band gap. The potentials of VBM of CuGaS$_2$ and CuGa$_5$S$_8$ are 0.7 V$_{NHE}$ and 0.9 V$_{NHE}$ respectively, based on the normal hydrogen electrode (NHE), as shown in FIG. 1.

Figure 2:
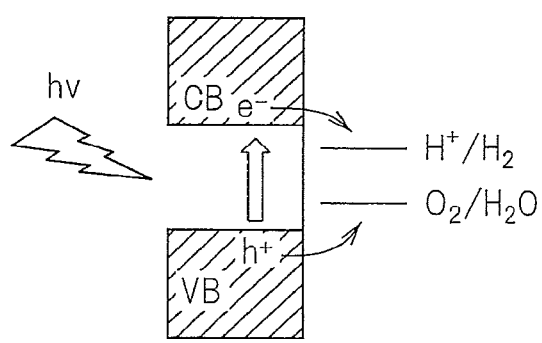
FIG. 2 is a conceptual view of water splitting by a semiconductor material.

On the other hand, in order for the above-described semiconductor material to effectively act as a photocatalyst in water splitting, it is generally preferred that CBM and VBM of the semiconductor material are positioned so as to sandwich the reduction potential and the oxidation potential of water, as described above. More specifically, the fundamental concept of water splitting using a semiconductor material is that an electron present in the valence band (VB) of the semiconductor material is excited into the conduction band (CB) by irradiating light, and the produced electron (e$^-$) and hole (h$^+$) split water by a redox reaction, as shown in the conceptual view of FIG. 2. Incidentally, the redox reaction of water is represented by the following reaction formulae:

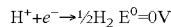
Reduction reaction: $H^+ + e^- \rightarrow \frac{1}{2}H_2$  $E^0 = 0V$

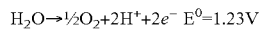
Oxidation reaction: $H_2O \rightarrow \frac{1}{2}O_2 + 2H^+ + 2e^-$  $E^0 = 1.23V$ Such a redox reaction is a reaction where an electron moves, and therefore is required to be a reaction exhibiting a negative Gibbs energy change in order to cause the reaction, i.e., a reaction where the electron transfers to a lower redox level. Thus, in order to satisfy such conditions, it is preferred that CBM and VBM of the semiconductor material are positioned so as to sandwich the reduction potential and the oxidation potential of water, i.e., VBM>1.23 V$_{NHE}$ and CBM<0 V$_{NHE}$ based on the normal hydrogen electrode (NHE). When such requirements are satisfied, the water splitting reaction can be allowed to proceed only by the photocatalytic action of the semiconductor material ideally without the external applied voltage. Alternatively, even if such requirements are not completely satisfied, it is possible to reduce the external applied voltage required in the water splitting reaction using a semiconductor material by providing conditions which are as near as possible thereto.

The potential of CBM of each of CuGaS$_2$ and CuGa$_5$S$_8$ which correspond to a Cu(In,Ga) (Se,S)$_2$ material is lower than 0 V$_{NHE}$, and therefore satisfies the requirement of CBM<0 V$_{NHE}$. However, the potentials of VBM of CuGaS$_2$ and CuGa$_5$S$_8$ are 0.7 and 0.9 V$_{NHE}$, respectively, as shown in FIG. 1, which are fairly lower than 1.23 V$_{NHE}$, and therefore do not satisfy the requirement of VBM>1.23 V$_{NHE}$.

The present inventors have taken note and studied a Cu-based chalcopyrite material such as Cu(In,Ga) (Se,S)$_2$ in which Cu is replaced with Ag, and have found that a material comprising a Ga selenide, an Ag—Ga selenide or both thereof has higher VBM based on NHE, compared with similar Cu-based chalcopyrite materials. Furthermore, they have found that when such a material is used in a photocatalyst for water splitting, high water splitting activity is achieved in various compositions.

According to the present invention, the Ga selenide includes, but is not particularly limited to, for example, a compound selected from the group consisting of GaSe, Ga$_2$Se$_3$ and a combination thereof and is preferably GaSe.

According to the present invention, the Ag—Ga selenide includes, but is not particularly limited to, for example, a compound selected from the group consisting of AgGaSe$_2$, AgGa$_5$Se$_8$ and a combination thereof and is preferably AgGaSe$_2$.

Figure 3:
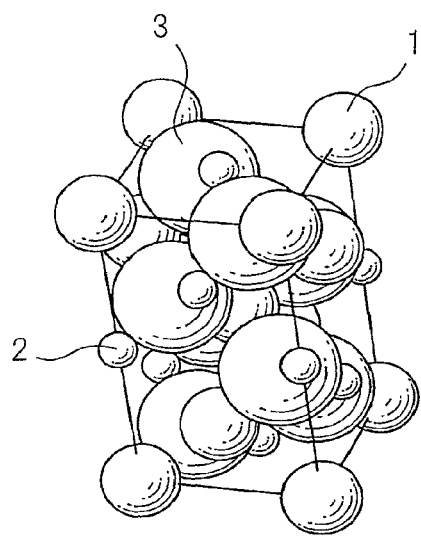
FIG. 3 is a schematic view showing the crystal structure of AgGaSe$_2$ which is one of Ag—Ga selenides.

FIG. 3 is a schematic view showing the crystal structure of AgGaSe$_2$ which is one of Ag—Ga selenides. In FIG. 3, numeral "1" indicates Ag, numeral "2" indicates Ga, and numeral "3" indicates Se. This AgGaSe$_2$ has a chalcopyrite-type crystal structure and a band gap of about 1.6 to 1.8 eV (O. Madelung, U. Rossler, M. Schulz, The Landolt-Bornstein Database, silver gallium selenide (AgGaSe$_2$) energy gaps, Springer Materials), and there have been reported both a p-type semiconductor and an n-type semiconductor (Nigge, K M. et al., Sol. Energy Mater. Sol. Cells 43 (1996) 335).

In CuGaSe$_2$ which is a Cu-based chalcopyrite material, it is generally known that a defect phase of a composition such as CuGa$_3$Se$_5$ and CuGa$_5$Se$_8$ can be formed by reducing the Cu element contained therein. Therefore, it is believed that a similar phenomenon occurs in AgGaSe$_2$ having the same chalcopyrite-type crystal structure, i.e., it is believed that a compound such as AgGa$_5$Se$_8$ can be formed as a defect phase of AgGaSe$_2$, for example, by appropriately selecting the Ag/Ga ratio, etc., in preparing AgGaSe$_2$.

In the embodiment of the present invention, the photocatalyst for water splitting of the present invention may be in the form of a single crystal containing any one of the above-described Ga selenides and Ag—Ga selenides, or may be in the form of a polycrystal containing any two or more of the above-described a selenides and Ag—Ga selenides. Incidentally, in the case of using the photocatalyst for water splitting of the present invention in the polycrystal form, the proportions of respective single crystals contained in the polycrystal are not particularly limited and may be determined depending on the conditions, etc., under which the photocatalyst for water splitting of the present invention is used.

The photocatalyst for water splitting of the present invention may be used in both forms of thin film and powder, and the form thereof may be appropriately selected depending on the embodiment, etc., in which the photocatalyst for water splitting of the present invention is used. For example, in the case of water splitting using a suspension system where the photocatalyst for water splitting of the present invention is dispersed in water, the photocatalyst for water splitting of the present invention can be used in the form of powder. On the other hand, in the case of water splitting using the photocatalyst for water splitting of the present invention in an electrode system, the photocatalyst for water splitting of the present invention can be used in the form of thin film.

The photocatalyst for water splitting of the present invention may be produced by any method known to a person skilled in the art. For example, in the case of using the photocatalyst for water splitting of the present invention as a photoelectrode in the form of thin film, the photoelectrode can be produced, for example, as follows.

First, for example, a transparent substrate such as glass is disposed as a substrate of a photoelectrode in a chamber. Then, an electrically conductive layer is deposited as a collective electrode on the substrate under reduced pressure. Incidentally, the deposition may be suitably performed by appropriate means depending on the type of the metal constituting the electrically conductive layer, in particular, when a high melting-point material such as Mo, etc., is used as the electrically conductive layer, the deposition is preferably performed by sputtering. In addition, in this case, in order to improve the adhesiveness between the electrically conductive layer and the substrate, another metal, for example, titanium (Ti), etc., may be optionally deposited as an adhesive layer on the substrate before depositing the electrically conductive layer.

Then, a photocatalyst layer consisting of the photocatalyst for water splitting of the present invention comprising a Ga selenide, an Ag—Ga selenide or both thereof is deposited on the electrically conductive layer using, for example, a vacuum deposition method, etc. Specifically, a photocatalyst layer comprising a Ga selenide, an Ag—Ga selenide or both thereof can be formed on the electrically conductive layer by evaporating respective metal materials of silver (Ag), gallium (Ga) and selenium (Se) constituting the Ga selenide or Ag—Ga selenide from separate boats or crucibles under heating and depositing them on the electrically conductive layer. Incidentally, in the case of depositing a photocatalyst layer comprising only a Ga selenide on the electrically conductive layer, the same operation may be performed using only respective metal materials of Ga and Se. The order of depositing respective metal elements is not particularly limited, for example, Ag, Ga and Se may be simultaneously deposited, or Se may be deposited after deposition of Ag and Ga. However, it is not preferred to deposit Se before deposition of Ag and Ga, since Se has a lower boiling point compared with other two metal elements and may be evaporated under high temperature during deposition of Ag or Ga.

Alternatively, another method for depositing a photocatalyst layer consisting of the photocatalyst for water splitting of the present invention may include, for example, heat-treating a substrate at a predetermined temperature in a selenium-containing gas atmosphere, particularly, in hydrogen selenide ($H_2Se$) gas, wherein the substrate comprises a electrically conductive layer and Ag and/or Ga deposited thereon by a sputtering or vacuum deposition method. This method also makes it possible to form a photocatalyst layer comprising a Ga selenide, an Ag—Ga selenide or both thereof on the electrically conductive layer.

For example, in the case where respective metal elements of Ag, Ga and Se are separately deposited in sequence by the above-described vacuum deposition method, the compositional ratio of the Ga selenides and Ag—Ga selenides in the finally obtained photocatalyst layer can be suitably controlled by depositing each metal element in an appropriate thickness using any suitable means. For example, if Ag is not deposited at all, a Ga selenide such as GaSe and $Ga_2Se_3$ can be of course selectively produced, or if an Ag layer is deposited such that the amount of Ag is smaller than that of Ga, in addition to the above-described Ga selenide, $AgGa_5Se_8$, etc., can be selectively deposited as an Ag—Ga selenide compared with $AgGaSe_2$. On the other hand, as the amount of Ag deposited is increased, it is possible to prevent production of a Ga selenide or $AgGa_5Se_8$, and to selectively produce an Ag—Ga selenide containing mainly $AgGaSe_2$.

As described above, the photocatalyst for water splitting of the present invention comprises a Ga selenide, an Ag—Ga selenide or both thereof. However, the photocatalyst for water splitting of the present invention may further comprise other components, especially a promoter. For example, the photocatalyst for water splitting of the present invention alone may not necessarily achieve a sufficient reaction rate for hydrogen production through water splitting. In such a case, the hydrogen production through water splitting can be accelerated by supporting, for example, a noble metal, especially at least one of Rh and Pt as a promoter on the photocatalyst for water splitting of the present invention.

Supporting of the metal such as Rh and Pt may be performed by any method known to a person skilled in the art. For example, supporting of the metal may be performed by providing a compound containing a cation of the metal as a metal source, dipping the photocatalyst for water splitting of the present invention in an electrolytic solution containing the compound in a predetermined concentration, and irradiating the electrolytic solution with light using a xenon (Xe) lamp, etc. Since this makes it possible to preferentially proceed the reduction reaction of the metal ion on the surface of the photocatalyst by the catalytic action of the photocatalyst, compared with the reduction reaction of hydrogen ion, the metal ion can be deposited as a metal on the surface of the photocatalyst. The amount of the metal supported is not particularly limited and may be determined depending on desired photocatalytic performance.

The water splitting reaction using the photocatalyst for water splitting of the present invention can be performed by any method known to a person skilled in the art. For example, water may be split to generate hydrogen by using the photocatalyst for water splitting of the present invention in the form of powder, dispersing it in water, and irradiating the dispersion with light from a Xe lamp as a light source, while stirring as necessary. Alternatively, water may be split to generate hydrogen by combining the photocatalyst for water splitting of the present invention in the form of a thin film and an electrically conductive film, etc., to constitute a photoelectrode, and disposing the photoelectrode in water together with a platinum electrode, etc., as a counter electrode, and irradiating the photoelectrode with light from a Xe lamp, etc., which also used as a light source.

The present invention is described in more detail below based on Examples, but the present invention is not limited thereto.

EXAMPLES

In the following examples, photoelectrodes for water splitting comprising a photocatalyst layer consisting of the photocatalyst for water splitting of the present invention were produced, and the produced photoelectrodes were examined for the influence and effect of varying the atom ratio (Ag/Ga ratio) between Ag and Ga contained in the photocatalyst layer in the range of 0 to 1.2.

Example 1

Production of Photoelectrode

First, soda lime glass (SLG) having an area of 5×10 mm$^2$ was subjected to ultrasonic cleaning in ethanol, and was used as a substrate. Then, the substrate was inserted into a chamber of an RF-magnetron sputtering apparatus, and the inside of the chamber was vacuumized to a pressure of about $10^{-4}$ Pa. Then, Ti was sputtered on the SLG substrate for 5 minutes using Ar plasma under the conditions of a substrate temperature of 200° C., a sputtering power of 100 W and an Ar partial pressure of $8\times10^{-2}$ Pa to deposit a Ti layer as an adhesive layer, and subsequently Mo was sputtered on the Ti layer for 20 minutes to deposit an Mo layer as a collective electrode.

Next, while heating the obtained Mo/Ti/SLG substrate at 300° C. in a molecular beam epitaxy (MBE) apparatus, Ga was vacuum-deposited on the Mo layer at deposition rate of 0.08 to 0.11 nm/s using a quartz oscillator film thickness meter to deposit a Ga thin film having a thickness of 700 nm. Then, the obtained Ga thin film was exposed to an Se vapor while heating it in the MBE apparatus to selenize the Ga thin film, thereby finally obtaining a photoelectrode for water splitting comprising a Ag-free (i.e., Ag/Ga ratio=0) photocatalyst layer. Incidentally, during the selenization, the pressure in the MBE apparatus was <5×10$^{-6}$ Pa, the substrate temperature was from 300 to 500° C., the selenization time was from 60 to 180 minutes, and the Se supply rate was from 0.6 to 1.0 nm/s.

Examples 2 to 8

In Examples 2 to 8, photoelectrodes for water splitting comprising photocatalyst layers having the Ag/Ga ratios of 0.06, 0.17, 0.24, 0.55, 0.60, 0.77 and 1.20, respectively, were obtained in the same manner as in Example 1, except for vacuum-depositing Ag on the Mo layer at a deposition rate of 0.4 to 0.5 nm/s before vacuum deposition of Ga on the Mo/Ti/SLG substrate and depositing an Ag thin film and a Ga thin film to a thickness giving an Ag/Ga ratio (atom ratio) of 0.06 to 1.20.

[Analysis of Photocatalyst Layer]

Figure 4:
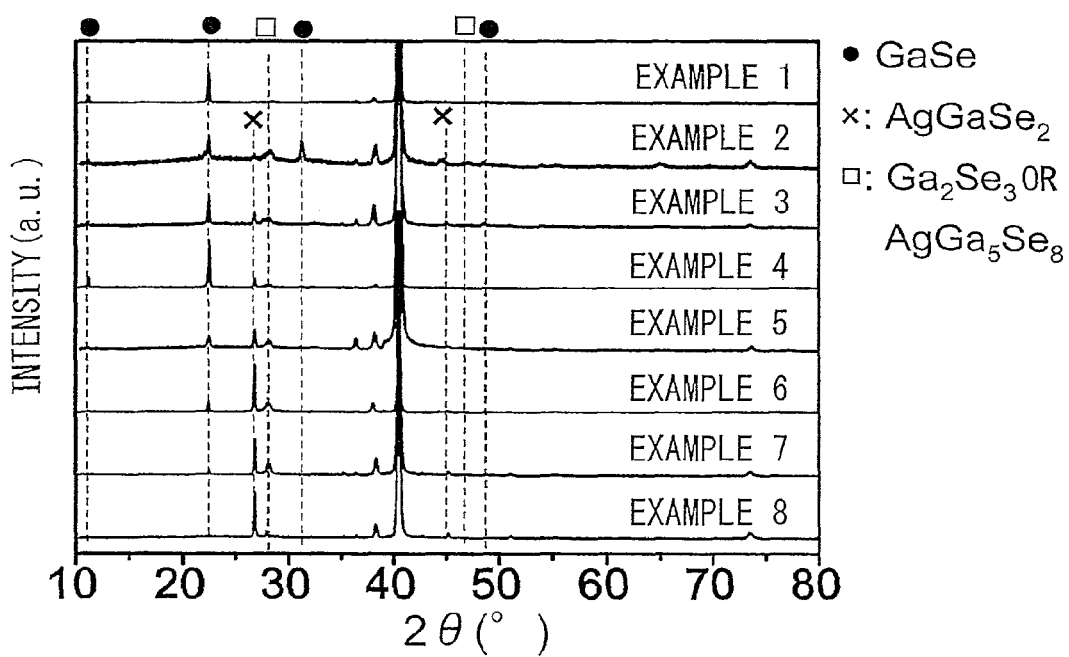
FIG. 4 shows the XRD patterns of the samples of Examples 1 to 8.

Each of the samples obtained in Examples 1 to 8 was measured by the X-ray diffraction (XRD). FIG. 4 shows the XRD pattern of the samples of Examples 1 to 8.

Referring to FIG. 4, a diffraction peak from AgGaSe$_2$ was mainly detected in an Ag/Ga ratio near 1, in particular an Ag/Ga ratio of 0.6, and as Ga became excess, in particular in an Ag/Ga ratio of <0.3, a diffraction peak from GaSe was mainly detected. The XRD pattern of AgGa$_5$Se$_8$ was obtained by citing the lattice constant of AgGa$_5$Se$_8$ from the literature (H. Ishizaki, K. Yamada, R. Arai, Y. Kuromiya, Y. Masatsugu, N. Yamada and T. Nakada, Mater. Res. Soc. Symp. Proc. 865, (2005) 143) and performing calculation on the assumption that AgGa$_5$Se$_8$ has the same structure as that of AgIn$_5$Se$_8$ (software used: CaRIne v3.1). As to the diffraction peaks of Ga$_2$Se$_8$ and AgGa$_5$Se$_8$, since the diffraction peaks of (130) and (031) planes of Ga$_2$Se$_3$ and (112) plane of AgGa$_5$Se$_8$ are detected at nearly the same position, and the diffraction peaks of (133) and (331) planes of Ga$_2$Se$_3$ and (204) plane of AgGa$_5$Se$_9$ are detected at nearly the same position, they were not able to be clearly distinguished. Incidentally, in each of the samples of Examples 1 to 8, a large diffraction peak detected near 2θ=40° is attributable to the Mo layer as a collective electrode.

Figure 5:
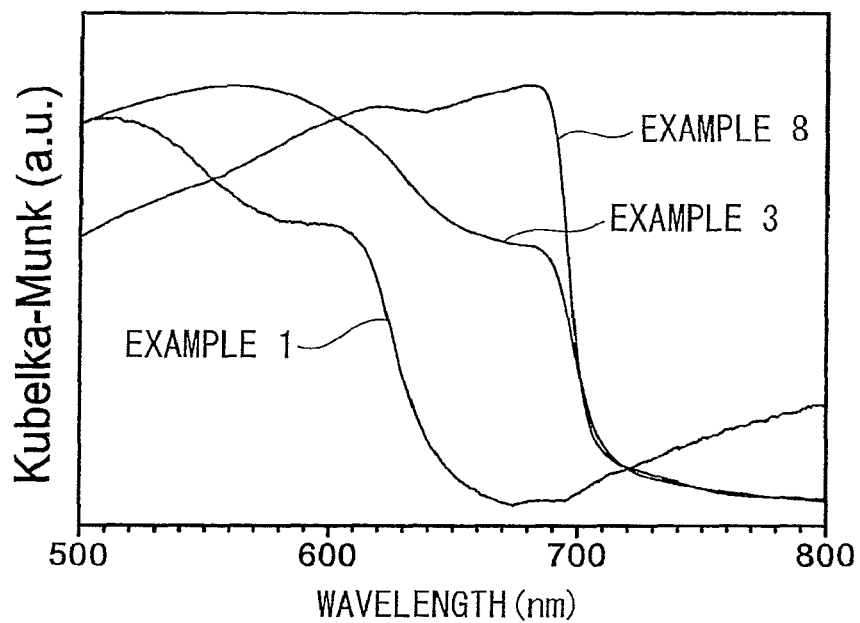
FIG. 5 shows the measurement results of UV-Vis DRS for the samples of Examples 1, 3 and 8.

Subsequently, each sample of Examples 1, 3 and 8 was measured by the UV-Vis DRS (ultraviolet-visible diffuse reflectance spectroscopy). FIG. 5 shows the measurement results of UV-Vis DRS for the samples of Examples 1, 3 and 8.

Referring to FIG. 5, in the sample of Example 1 where the Ag/Ga ratio was 0, light absorption was observed at about 590 nm and about 650 nm. It is believed that both absorption edges relate to a Ga selenide. Also, in the samples of Examples 3 and 8 where the Ag/Ga ratios were 0.17 and 1.2, respectively, light absorption estimated to be derived from AgGaSe$_2$ was observed at about 700 nm.

Figure 6:
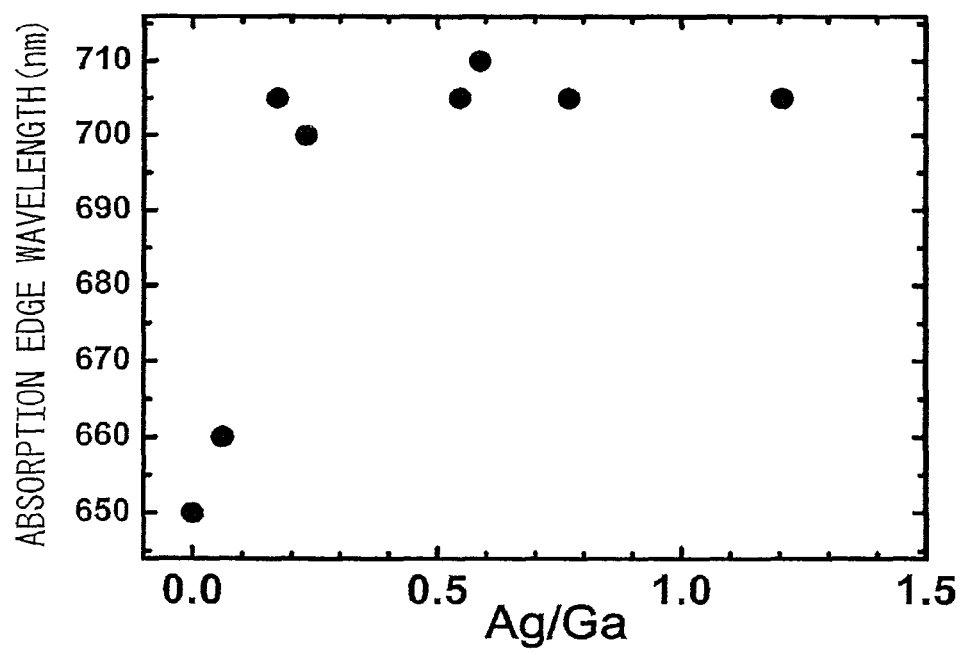
FIG. 6 shows the absorption edge wavelengths of the samples of Examples 1 to 8 measured by UV-Vis DRS.

Furthermore, the samples of Examples 1 to 8 were measured for the absorption edge wavelengths thereof by UV-Vis DRS, and the results are plotted in FIG. 6. FIG. 6 shows the absorption edge wavelengths of the samples of Examples 1 to 8 measured by UV-Vis DRS. In FIG. 6, the abscissa axis indicates the Ag/Ga ratio (atom ratio) and the ordinate axis indicates the absorption edge wavelength (nm). Referring to FIG. 6, in the samples of Examples 1 and 2 where the Ag/Ga ratio was 0 and 0.06, absorption edges were detected on the short wavelength side of 650 and 660 nm, respectively. On the other hand, in the samples of Examples 3 to 8 where the Ag contents were higher, the absorption edges were present in the range of about 700 to 710 nm, and therefore it is found that the absorption edge is not greatly changed by fluctuation in the Ag/Ga ratio except for the Ag/Ga ratio of near 0. It is generally known that the band gap of a sample can be determined from its absorption edge wavelength by measuring the UV-Vis spectrum, and as the absorption edge wavelength is shifted to the shorter wavelength side, the band gap becomes greater.

Therefore, it is understood from the results of FIGS. 5 and 6 that in the samples of Examples 1 and 2 where the Ag/Ga ratios are 0 and 0.06, respectively, the band gap is greater compared with the samples of Examples 3 to 8 where the Ag/Ga ratios are greater, and there is not much difference in the band gaps among the samples of Examples 3 to 8.

Example 9

In this example, 9 samples in total where the atom ratios (Ag/Ga ratios) between Ag and Ga contained in the photocatalyst layer were (a) 0, (b) 0.11, (c) 0.17, (d) 0.19, (e) 0.23, (f) 0.48, (g) 0.59, (h) 0.65 and (i) 0.75 were produced in the same manner as in Examples 1 to 8, and the conduction band minimum (CBM) and the valence band maximum (VBM) of each of the samples were calculated.

Figure 7:
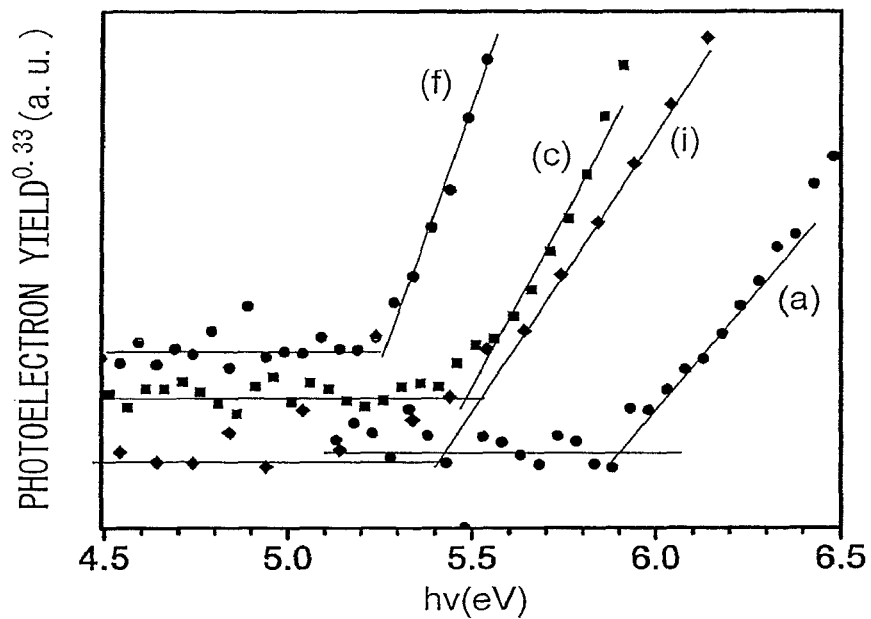
FIG. 7 shows the measurement results of photo-electron spectroscopy in air for the samples having the Ag/Ga ratios of 0, 0.17, 0.48 and 0.75, respectively.

First, samples (a) to (i) were measured by photo-electron spectroscopy in air. FIG. 7 shows the data of 4 samples out of these samples. FIG. 7 shows the measurement results of photo-electron spectroscopy in air for the samples having the Ag/Ga ratios of (a) 0, (c) 0.17, (f) 0.48 and (i) 0.75. In FIG. 7, the abscissa axis indicates the energy of irradiated light, and the ordinate axis indicates 0.33 power of the photoelectron yield. As shown in FIG. 7, the ionization potential was calculated from the energy at the intersection of the photoelectron yield with the background.

Figure 8:
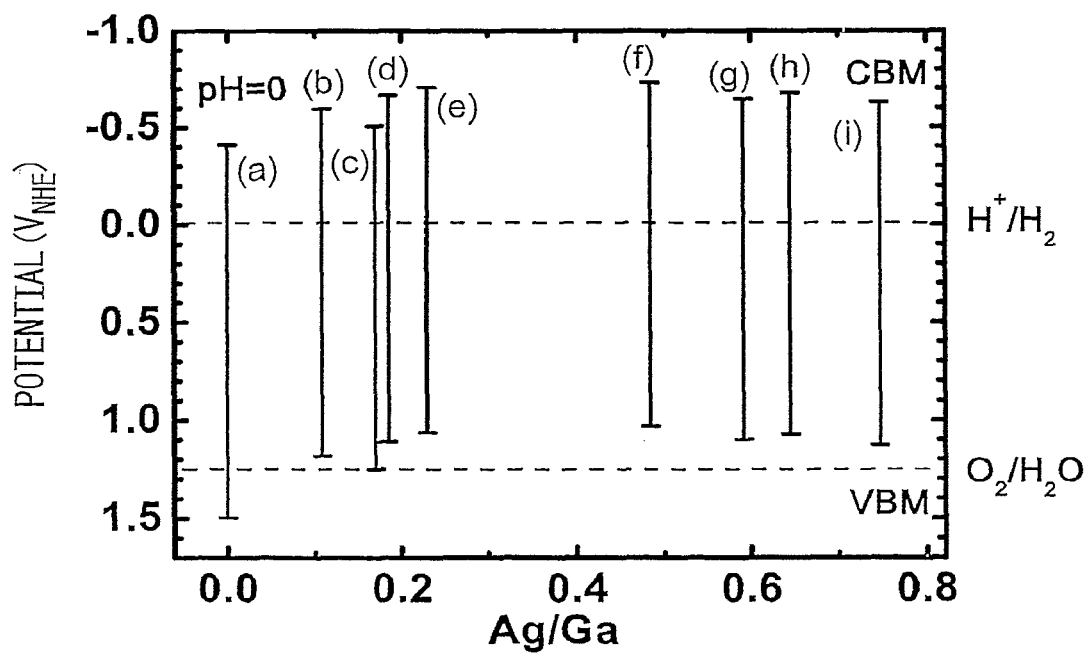
FIG. 8 shows the positions of the band gaps of samples (a) to (i) in Example 9.

Subsequently, the potentials of CBM and VBM of all of samples (a) to (i) were calculated based on the ionization potential calculated by the photo-electron spectroscopy in air and the band gap calculated from the absorption edge wavelength of UV-Vis DRS. The results thereof are shown in FIG. 8. FIG. 8 shows the positions of the band gaps of samples (a) to (i) in Example 9. In FIG. 8, the abscissa axis indicates the Ag/Ga ratio (atom ratio), and the ordinate axis indicates the potential (V vs. NHE) based on NHE (normal hydrogen electrode). Incidentally, the dashed lines in FIG. 8 indicate the reduction potential (0 $V_{NHE}$) and the oxidation potential (1.23 $V_{NHE}$) of water, respectively.

Referring to FIG. 8, in sample (a) having an Ag/Ga ratio of 0, it is found that CBM and VBM thereof are positioned so as to sandwich the reduction potential and the oxidation potential of water, i.e., satisfy the requirements of VBM>1.23 $V_{NHE}$ and CBM<0 $V_{NHE}$. Therefore, in the light of positions of CBM and VBM, it is believed that sample (a) has the most preferred band structure and high photoelectrochemical properties. On the other hand, in samples (b) to (i), it is found that the potentials of CBM and VBM exhibit a substantially constant value, although they slightly fluctuate due to a change in the Ag/Ga ratio. Although none of samples (b) to (i) satisfies the requirement of VBM>1.23 $V_{NHE}$, it is found that all of these samples have higher VBM based on NHE, compared with $CuGaS_2$ (VBM=0.7 $V_{NHE}$) and $CuGa_5S_8$ (VBM=0.9 $V_{NHE}$) which are Cu-based chalcopyrite materials shown in FIG. 1.

Example 10

Photoelectrochemical Measurement

Figure 9:
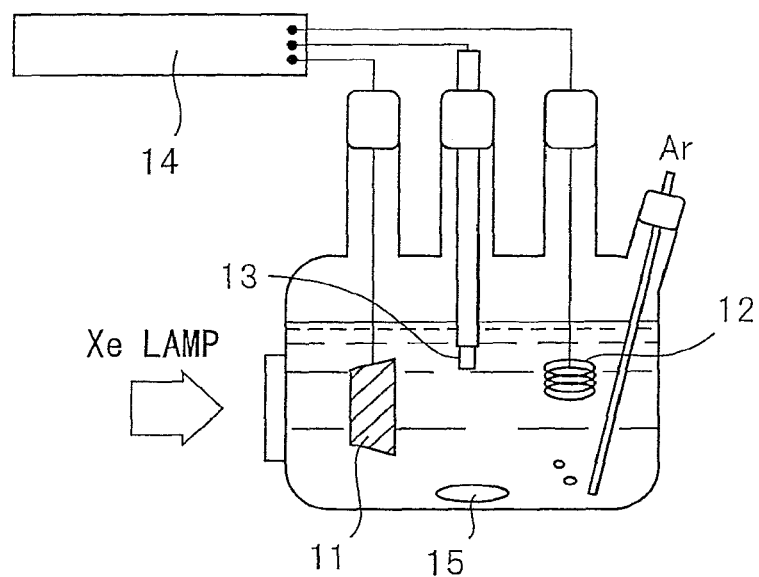
FIG. 9 is a schematic view of the apparatus used in photoelectrochemical measurement.

In this example, a photoelectrode for water splitting comprising a photocatalyst layer having an Ag/Ga ratio of 0.15 was produced in the same manner as in Examples 1 to 8, and subjected to photoelectrochemical measurement using the apparatus shown in FIG. 9. In the photoelectrochemical measurement, a conducting wire was adhered to the Mo layer of the photoelectrode for water splitting by indium (In), and the unnecessary portion was covered with an epoxy resin and prevented from contacting with the electrolytic solution.

FIG. 9 is a schematic view of the apparatus used in the photoelectrochemical measurement. In this apparatus, the photoelectrode for water splitting of the present invention was used as working electrode 11, a Pt wire was used as counter electrode 12, and an Ag/AgCl electrode was used as reference electrode 13. In addition, stirring was performed by magnetic stirrer 15, etc., as necessary, and the current through working electrode 11 was measured while controlling the potential by potentiostat 14 (HSV-100, manufactured by Hokuto Denko Corporation). Incidentally, the scanning speed was 5 mV/s, and the potential was converted based on reversible hydrogen electrode (RHE) according to the Nernst equation. Furthermore, in order to ensure sufficient electrical conductivity, an aqueous 0.1 M $Na_2SO_4$ solution was used as the electrolytic solution, and the pH of the electrolytic solution was adjusted to 9 by adding an aqueous NaOH solution. Before the measurement, Ar gas was blown into the solution so as to remove dissolved oxygen. A 300 W Xe lamp (λ=420 to 800 nm) equipped with a cold mirror and a cut-off filter (L-42, manufactured by HOYA) was used as a light source. Light was intermittently irradiated by repeating irradiation and blocking of light at intervals of 3 seconds using a shutter, and the dark current and the current during light irradiation were measured.

Furthermore, in this example, in order to examine the effect of the surface modification of a photocatalyst by a metal, the photoelectrode further comprising Rh or Pt supported on the photocatalyst layer of the above-described photoelectrode for water splitting was also subjected to photoelectrochemical measurement. Incidentally, supporting of Rh or Pt on the photocatalyst layer was performed by a photoelectrodeposition method. Specifically, the apparatus of FIG. 9 was used, 0.4 μmol of $Na_3RhCl_6$ was added to 100 ml of an aqueous 0.1 M $Na_2SO_4$ solution (pH=9), and the photoelectrode for water splitting comprising a photocatalyst layer was dipped in the resulting solution. Then, the potential was kept at −0.4 V vs. Ag/AgCl, and Rh ion was reduced by light irradiation for 30 to 200 minutes until the photocurrent value was saturated, thereby depositing Rh on the photocatalyst layer. Supporting of Pt on the photocatalyst layer was performed in the same manner as in the case of Rh, except that $H_2PtCl_6$ was added to 100 ml of an aqueous 0.1 M $Na_2SO_4$ solution (pH=9) and the holding potential was changed to −0.7 V vs. Ag/AgCl.

Figure 10:
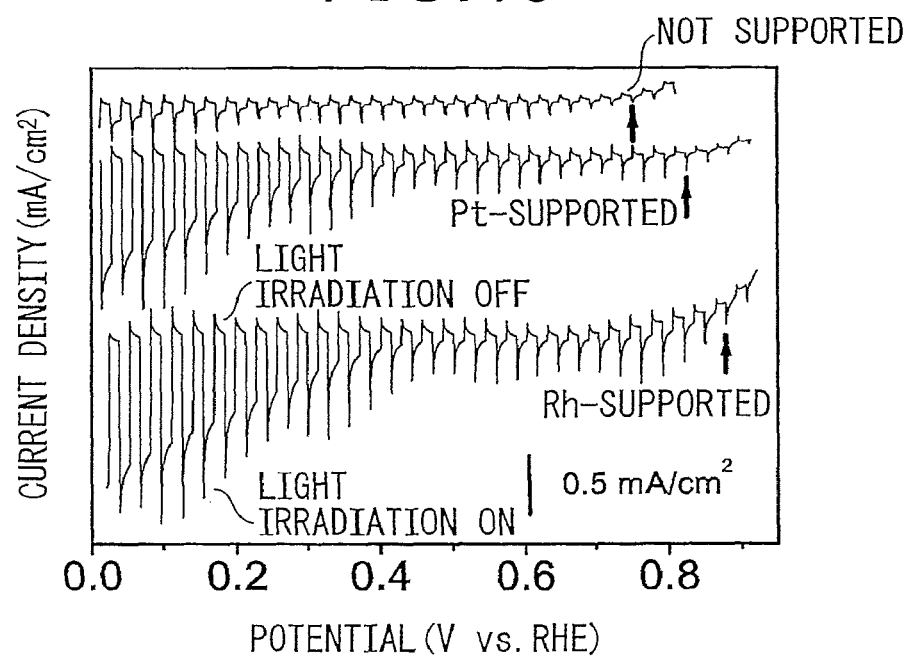
FIG. 10 shows the results of photoelectrochemical measurement for three photoelectrodes for water splitting, i.e., a photoelectrode for water splitting comprising a photocatalyst layer having an Ag/Ga ratio of 0.15, and photoelectrodes for water splitting further comprising Rh and Pt, respectively, supported thereon.

Three photoelectrodes for water splitting, i.e., a photoelectrode for water splitting comprising a photocatalyst layer having an Ag/Ga ratio of 0.15, and photoelectrodes for water splitting further comprising Rh and Pt, respectively, supported thereon were subjected to photoelectrochemical measurement. FIG. 10 shows the results. In FIG. 10, the abscissa axis indicates the potential (V vs. RHE) based on RHE (reversible hydrogen electrode), and the ordinate axis indicates the current density (mA/cm$^2$).

As described above, the photoelectrochemical measurement was performed by intermittent irradiation of light at intervals of 3 seconds. Referring to FIG. 10, it was confirmed that in each of three photoelectrodes for water splitting, a current was allowed to flow by turning on or off light irradiation. Also, as seen from the results of FIG. 10, the highest current density was obtained in the photoelectrode for water splitting on which Rh was supported. Furthermore, with respect to each of photoelectrodes for water splitting, the potential was scanned from the low potential side to the high potential side by a potentiostat to detect the potential where a current started flowing as shown by an arrow in FIG. 10, and the detected potential was defined as a photocurrent initial potential. The following Table 1 shows the photocurrent initial potential ($V_{RHE}$) and the current density (mA/cm$^2$) at 0.1 $V_{RHE}$ of each of photoelectrodes for water splitting.

TABLE 1

Photoelectrochemical Measurement of
Photoelectrode Comprising Photocatalyst Layer Having an
Ag/Ga ratio of 0.15

|  | Photocurrent Initial Potential ($V_{RHE}$) | Current Density at 0.1 $V_{RHE}$ (mA/cm$^2$) |
|---|---|---|
| No surface modification | 0.77 | 0.10 |
| Surface modification by Pt | 0.82 | 0.65 |
| Surface modification by Rh | 0.88 | 0.90 |

It was found from the results of FIG. 10 and Table 1 that all of the photoelectrodes exhibited water splitting activity with or without surface modification by a metal. Above all, it was found that the Rh-supported photoelectrode showed high values in both the photocurrent initial potential and the current density, and therefore exhibited the highest water splitting activity.

[Influence of Ag/Ga Ratio Regarding Rh-Supported Photoelectrode]

Figure 11:
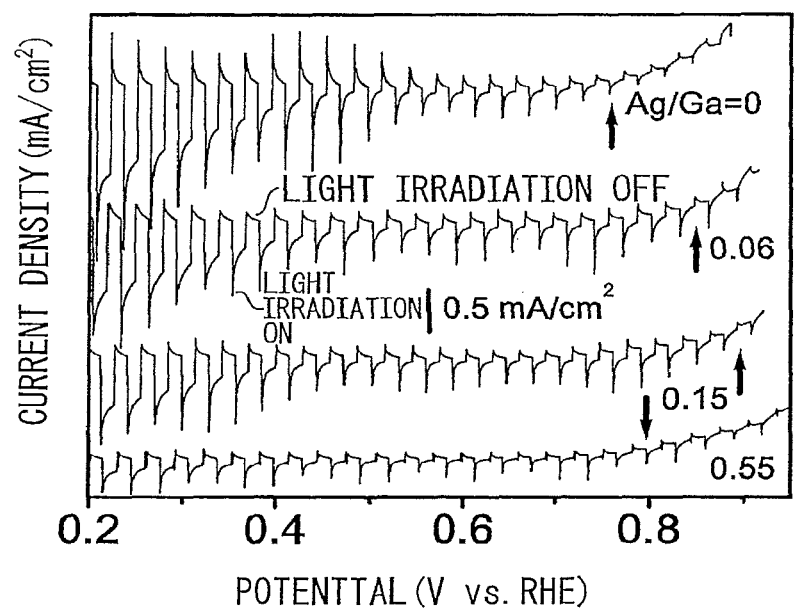
FIG. 11 shows the results of photoelectrochemical measurement for photoelectrodes for water splitting (Ag/Ga ratio=0, 0.06, 0.15 and 0.55) on which Rh is supported.

Next, the Rh-supported photoelectrode which exhibited the highest water splitting activity in the above photoelectrochemical measurement was examined for the influence of varying the Ag/Ga ratio. Specifically, photoelectrodes for water splitting were produced by supporting Rh on photocatalyst layers having Ag/Ga ratios of 0, 0.06, 0.15 and 0.55, respectively, in the same manner as explained above, and each of these photoelectrodes for water splitting was subjected to photoelectrochemical measurement. FIG. 11 shows the results. In addition, the following Table 2 shows the values of photocurrent initial potential ($V_{RHE}$) (shown by an arrow in FIG. 11) of photoelectrodes for water splitting obtained from FIG. 11.

TABLE 2

Influence of Ag/Ga Ratio
Regarding Rh-Supported Photoelectrode

| Ag/Ga Ratio | Photocurrent Initial Potential ($V_{RHE}$) |
|---|---|
| 0 | 0.75 |
| 0.06 | 0.85 |
| 0.15 | 0.90 |
| 0.55 | 0.80 |

Referring to the results of FIG. 11 and Table 2, with respect to the current density, the highest value was obtained in the Rh-supported electrode having an Ag/Ga ratio=0. However, with respect to the photocurrent initial potential, the Rh-supported electrode having an Ag/Ga ratio=0.15 exhibited the highest value. On the other hand, the results of FIG. 8 suggest that the photoelectrode comprising a photocatalyst layer having an Ag/Ga ratio=0 has the most preferred band structure for water splitting, and therefore has high photoelectrochemical properties, as described in relation to FIG. 8. Thus, there was not necessarily complete agreement between the results of FIG. 11 and the results of FIG. 8.

Without wishing to be bound by any particular theory, in some measurement samples, for example, the measurement sample having an Ag/Ga ratio=0, a photoanodic response was observed on the high potential side, and therefore it is believed that a part of the sample was converted into n-type. Also, it is believed that such partial conversion of the sample into n-type made a difference between the results expected from the positions of CBM and VBM shown in FIG. 8 and the results obtained by the photoelectrochemical measurement.

[Relationship Between Hydrogen Production and Photocurrent Value]

Figure 12:
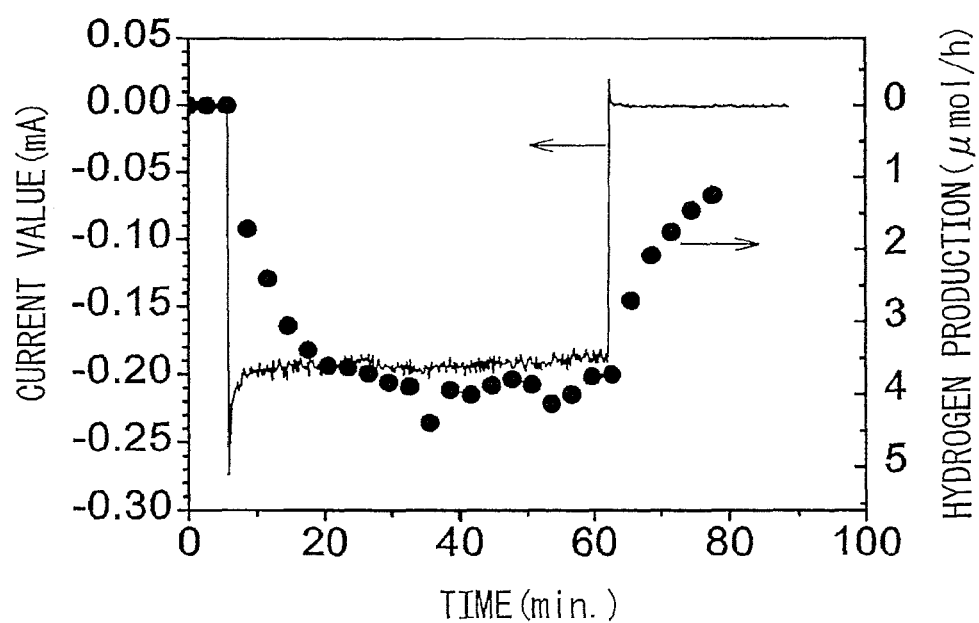
FIG. 12 shows the relationship between the current-time curve and the hydrogen production of an Rh-supported photoelectrode having an Ag/Ga ratio of 0.15.

The gas produced in the photoelectrochemical measurement using the Rh-supported photoelectrode having an Ag/Ga ratio=0.15 was analyzed, and FIG. 12 shows the results.

FIG. 12 shows the relationship between the current-time curve and the hydrogen production of the Rh-supported photoelectrode having an Ag/Ga ratio of 0.15. In FIG. 12, the abscissa axis indicates the time (minute), the left-side ordinate axis indicates the current value (mA) through the counter electrode at a potential of −0.7 V vs. Ag/AgCl, and the right-side ordinate axis indicates the hydrogen production (μmol/h) calculated from the peak area of gas chromatography (measured every 3 minutes). In FIG. 12, the values on the left-side ordinate axis and the right-side ordinate axis are shown to theoretically correspond to each other. Referring to FIG. 12, it is found that the current value observed in the photoelectrochemical measurement nearly agrees with the amount of hydrogen produced. This result shows that almost 100% of the photocurrent is utilized for reduction of water in the photoelectrode comprising the photocatalyst for water splitting of the present invention.

INDUSTRIAL APPLICABILITY

The photocatalyst for water splitting of the present invention has a higher valence band maximum (VBM) based on NHE (normal hydrogen electrode), compared with similar Cu-based chalcopyrite materials such as $Cu(In,Ga)(Se,S)_2$. Accordingly, higher water splitting activity can be achieved by using such a photocatalyst in a photoelectrode for water splitting.

The invention claimed is:

1. A method of splitting water, comprising:
contacting water with a photocatalyst,
wherein said photocatalyst comprises both $Ga_2Se_3$ and an Ag—Ga selenide, and
wherein an atom ratio between Ag and Ga in the photocatalyst is between 0.11 and 0.75, inclusive.

2. The method as claimed in claim 1, wherein said Ag—Ga selenide is selected from the group consisting of $AgGaSe_2$, $AgGa_5Se_8$ and a combination thereof.

3. The method as claimed in claim 2, wherein said Ag—Ga selenide is $AgGaSe_2$.

4. The method as claimed in claim 1, wherein said Ag—Ga selenide is $AgGa_5Se_8$.

5. The method as claimed in claim 1, wherein said photocatalyst further comprises at least one of Rh and Pt supported thereon.

6. A method of splitting water, comprising:
contacting water with a photoelectrode comprising a substrate, an electrically conductive layer formed on said substrate, and a photocatalyst layer formed on said electrically conductive layer and consisting of a photocatalyst,
wherein said photocatalyst comprises both $Ga_2Se_3$ and an Ag—Ga selenide, and
wherein an atom ratio between Ag and Ga in the photocatalyst is between 0.11 and 0.75, inclusive.

* * * * *